Figure 1:
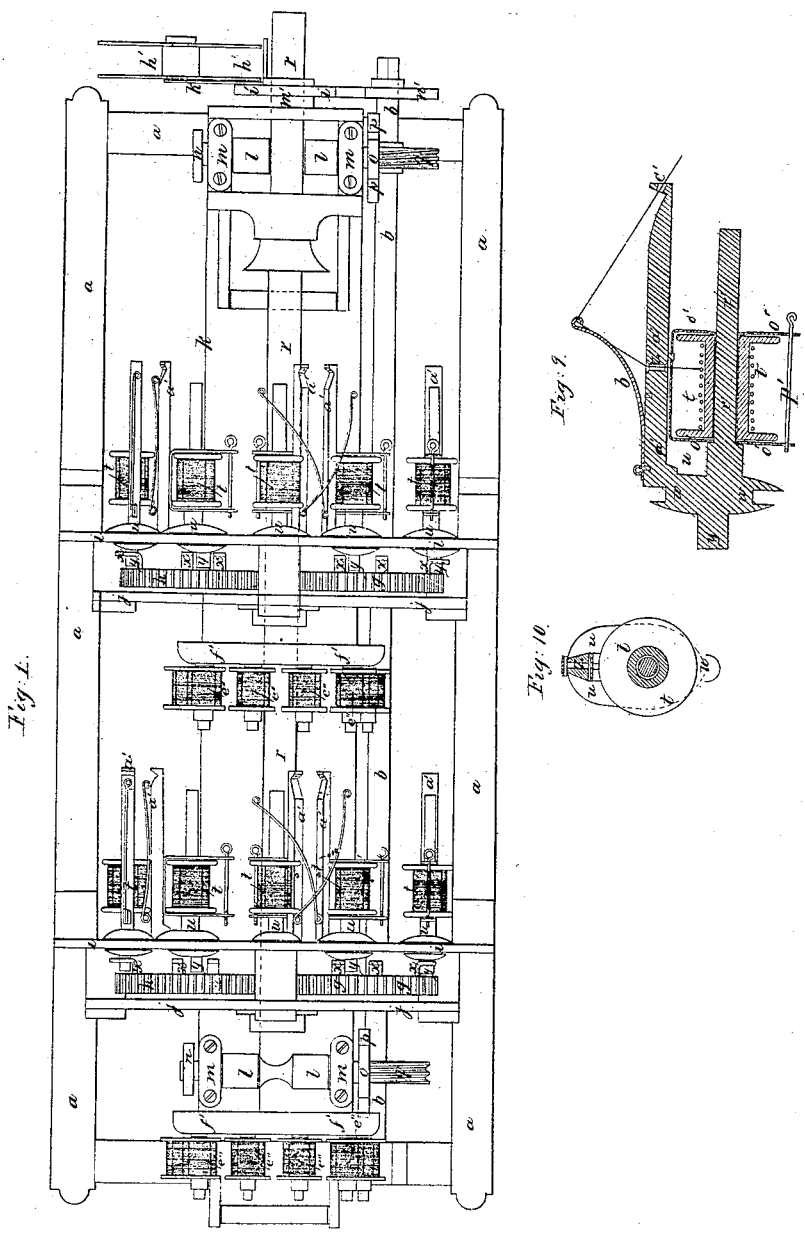

5 Sheets—Sheet 1.

T. J. MAYALL.
MANUFACTURE OF RUBBER HOSE OR TUBING.

No. 88,888.    Patented Apr. 13, 1869.

5 Sheets—Sheet 2.

T. J. MAYALL.
MANUFACTURE OF RUBBER HOSE OR TUBING.

No. 88,888. Patented Apr. 13, 1869.

Witnesses:

Inventor:

5 Sheets—Sheet 3.

T. J. MAYALL.
MANUFACTURE OF RUBBER HOSE OR TUBING.

No. 88,888. Patented Apr. 13, 1869.

Witnesses:
Albert W. Brown
Frederick A. Sayer

Inventor:
Thos. J. Mayall

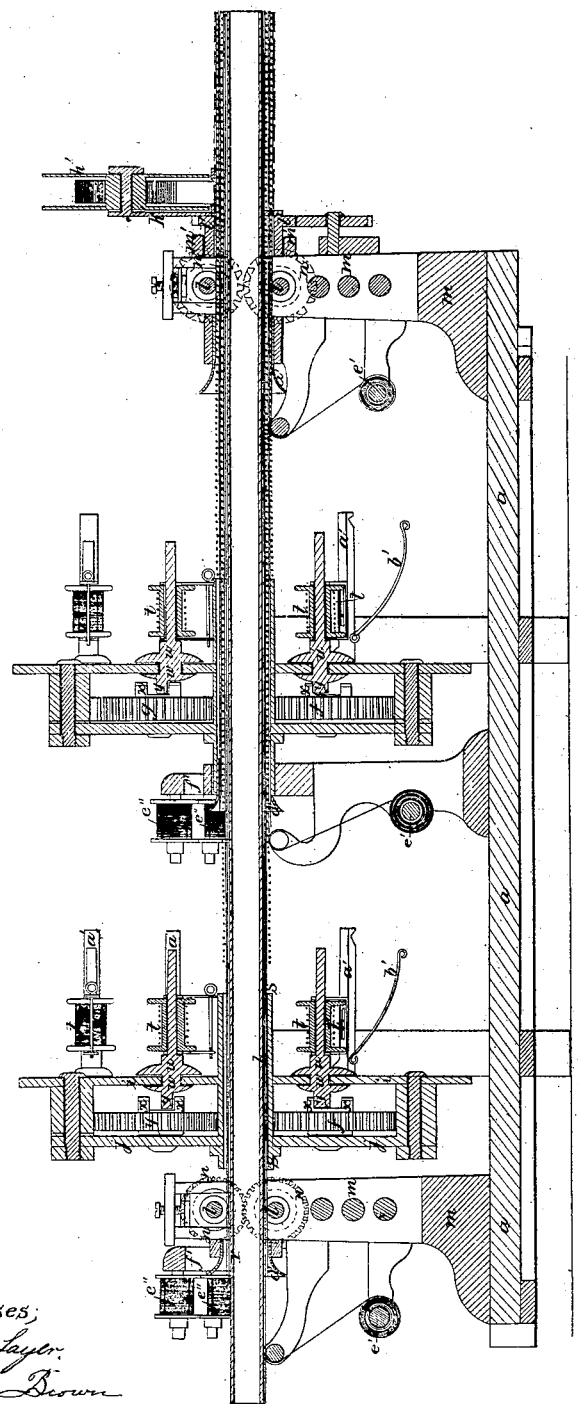

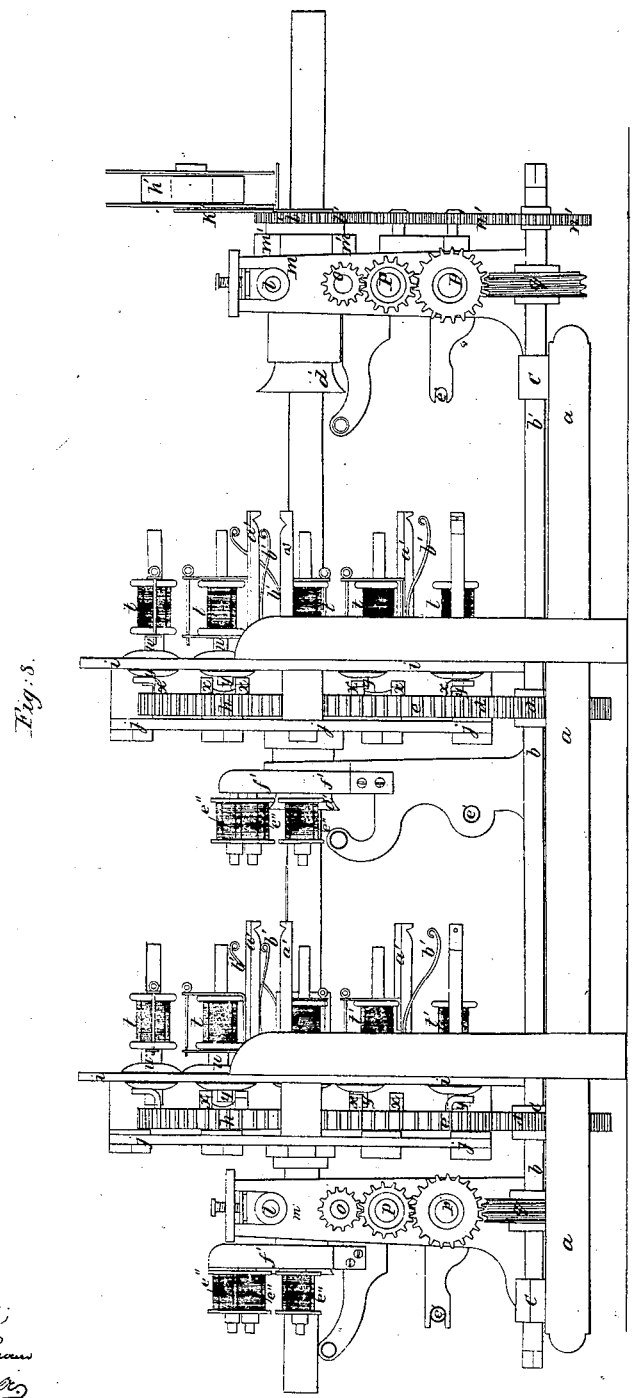

THOMAS J. MAYALL, OF ROXBURY, MASSACHUSETTS.

Letters Patent No. 88,888, dated April 13, 1869.

IMPROVEMENT IN THE MANUFACTURE OF RUBBER HOSE, OR TUBING.

The Schedule referred to in these Letters Patent and making part of the same.

*To all persons to whom these presents shall come:*

Be it known that I, THOMAS J. MAYALL, of Roxbury, in the county of Suffolk, and State of Massachusetts, have invented certain new and useful Improvements in Machines for Making Rubber Hose or Tubing; and that the following description, taken in connection with the accompanying drawings hereinafter referred to, forms a full and exact specification of the same, wherein I have set forth the nature and principles of my said improvements, by which my invention may be distinguished from all others of a similar class, together with such parts as I claim, and desire to have secured to me by Letters Patent.

The present invention has for its object the production, by means of machinery, of a hose, or tubing, for which I have previously secured Letters Patent of the United States, which consisted mainly in weaving, or braiding threads, cords, wire, &c., around an inner tube, or lining of India-rubber, gutta-percha, or other suitable material.

In my new apparatus for manufacturing hose, or tubing, I combine one or more sets of devices for feeding and lapping one or more sheets of rubber, gutta-percha, cloth covered with either or both, or any other suitable fabric, to constitute an inner tube, or lining around a mandrel, with one or more sets of weaving or braiding-devices, so arranged and operating as to form a netting, or covering of threads, cords, or wire around the said inner lining of the hose. I also combine a series of devices for accomplishing the two results above named, that is, forming alternate layers of flexible sheet-material and coverings of braided or woven netting, in such a manner that a hose, or tube can be formed of any desired number of plies, according to the purpose to which it is to be applied. I have also combined with the above an arrangement of devices for feeding to and placing upon the different plies of the hose, or tube, a series of longitudinal-binding threads or wires, for the purpose of strengthening the hose, or tubing, in a longitudinal direction, and preventing its being stretched, or elongated, while being drawn with the mandrel through the machine.

In my machine, I also accomplish the winding of the hose, or tube, when finished, with strips of cloth, tin-foil, or other suitable flexible material, in which it is to be vulcanized by an arrangement of devices to be hereinafter explained.

In the accompanying plates of drawings, my improvements in machines for making rubber or gutta-percha hose, or tubing, are represented in plate 1, of which—

Figure 1 is a plan or top view.

Figure 2:
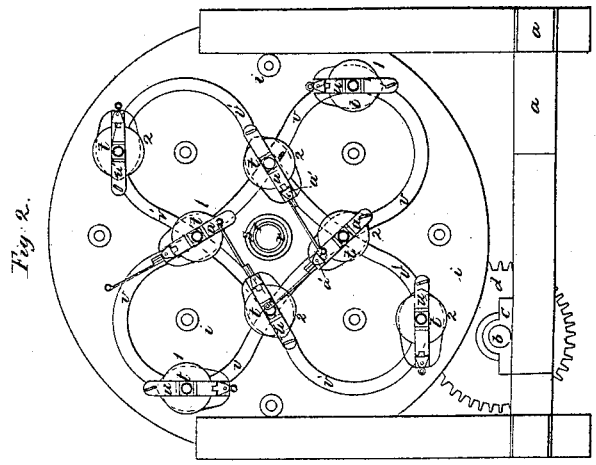

Figure 2, an end view of guiding-plate, with its bobbins.

Figure 3:
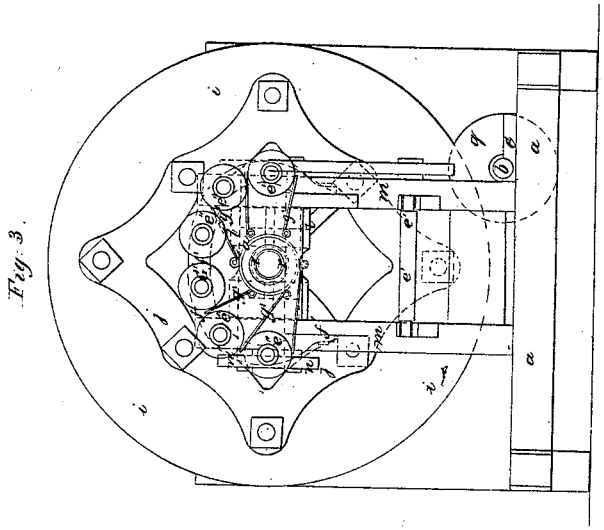

Figure 3, an end view.

Figure 4:
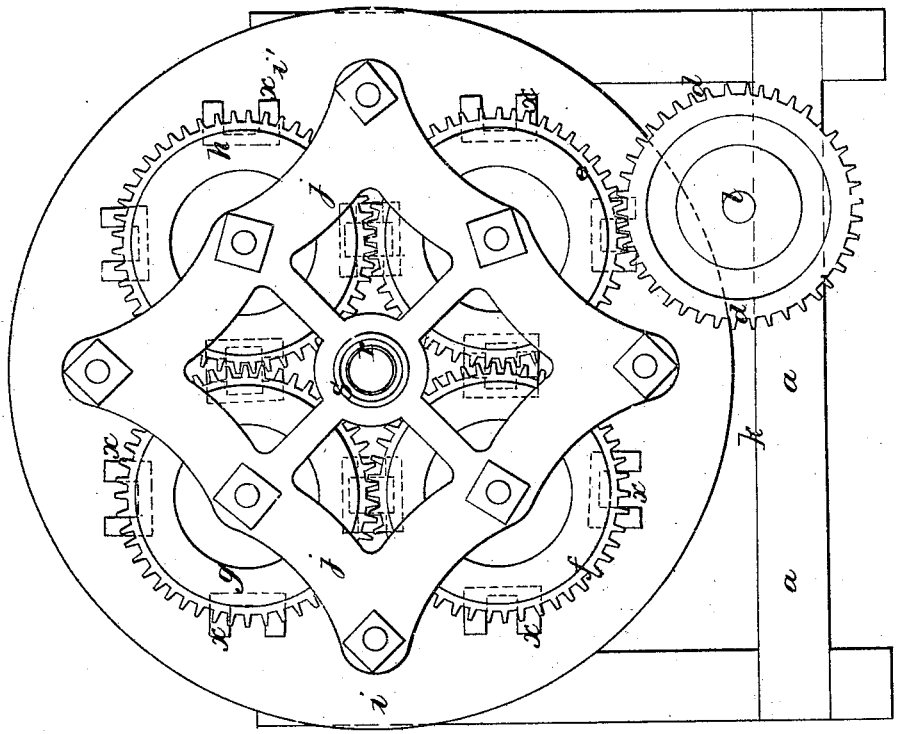

Figure 4, a front view of gearing for moving the bobbins.

Figures 9 and 10, detail views, to be hereinafter referred to.

In plate 2,

Figure 7 is a central longitudinal vertical section.

Figure 8, a side view.

$a\ a$, in the accompanying plates of drawings, represent the frame-work of my new machine.

$b\ b$, driving-shaft, having bearings at $c\ c$, on the frame-work $a$.

On the driving-shaft $b\ b$, are two gear-wheels $d\ d$, each engaging with another gear-wheel, $e$, of two series of interlocking gear-wheels, $e, f, g$, and $h$, the shafts of which have bearings in two parallel plates, $i\ i$, and vertical frames $j\ j$, secured together by bolts, &c., at short distances apart, the plates $i\ i$ being fastened to standards of the frame-work.

At each end of the platform $k$ of the frame-work are the devices for feeding the mandrel around which my improved hose is braided, or formed, as will be hereinafter described, the said devices being arranged and operating as follows.

$l\ l$ are two horizontal rollers, having bearings at each end, in the standard $m$ of the frame-work, susceptible of adjustment with regard to each other, and having gear-wheels $n\ n$ on the same end of their shafts, engaging with each other, and on the opposite end of the lower shaft a gear, $o$, receiving motion through intermediate gears $p\ p$, &c., from the worms $q\ q$ of the driving-shaft $b\ b$.

Between these rollers $l\ l$, longitudinally with the machine, the mandrel $r$ is passed, a suitable opening, $s$, being made through the plates $i$ and $j$, to allow of the same.

$t\ t$, &c., are a series of bobbins, arranged with their frames $u\ u$ on the surface of the plate $i$, at right angles thereto, and which are made to travel upon the same, being guided by the grooves $v\ v'$, &c., of the said plate, in which the shafts $w\ w$, &c., of the said frames are inserted around the said mandrel $r$, as will be now described.

Upon the surface of the gear-wheels $e\ f\ g\ h$ nearest the bobbins $t\ t$, &c., are arranged a series of clutches, $x\ x$, &c., at the proper distances apart, which, as the gears revolve, continuously and successively interlock with the rear projections, or studs $y\ y$, &c., of the bobbin-frames $u\ u$, and thus cause the same to be moved on the plate $i$, in their grooves, around the mandrel, as is evident without further description.

These grooves are made of the form and take the direction represented in Figure 2, plate 3, one set of bobbins marked 1 1 1 1, fig. 2, moving through the groove $v$, and the other set, marked 2 2 2, fig. 2, moving through the groove $v'$.

It will be seen from the above description, that, from the direction given to the two grooves $v\ v'$, for guiding the bobbins in their movement on the plate $i$, as described, the bobbins are made to pass down on one side of the mandrel r, and up on the other side thereof, thereby making a complete circuit of the same.

On these bobbins t t, &c., the wire, twine, thread, or strands to be used for braiding, or weaving my improved hose, is wound, as represented by yellow lines in the drawings, and the end thereof is then passed, as represented in Figure 9 of plate 2, first through the aperture z of the bar a', then through the eye of the spring b', secured to said bar, and finally through the aperture c', in the end of said bar a', to the mandrel, to which it is properly attached, together with the strands from the other bobbins, in proper position to be braided or woven upon the same, as the bobbins are made to move around the mandrel as described.

Previous, however, to braiding, or weaving the strands on the mandrel, as above described, a sheet of rubber, or any other similar material, is passed around the mandrel by means of a funnel-shaped guiding-tube, d', through which the rubber sheet from the feed-roll e' is passed, and thereby, as evident, gradually made to close around the mandrel, as desired, and its edge also lapped, or firmly united. By this means, a water-proof lining is given to the braided, or woven strands, or threads, and a firm and strong rubber hose, or tubing obtained.

At the same time that the rubber sheet is placed around the mandrel, as has been above described, and while it is passing through the funnel-shaped tubes d', &c., I also cause a series of strands of wire, thread, twine, or other similar material, represented by red lines in drawings, to be delivered from spools e'' of the stationary frame f'', passing through guides g', and laid along longitudinally upon the rubber sheet at equal and regular distances of its periphery, over which the strands are braided, as described. A rubber sheet may then be placed over and around the tube, as above formed, and it then made ready for vulcanization, or another layer of longitudinal binders and braided strands may be laid and woven upon the same, as has been above described, and so on for any degree of thickness of hose.

It is apparent that, in lieu of having only one or two of the braiding, or weaving-devices above described arranged in the machine, more may be used, and thereby any number of layers of strands can be braided, or woven around the tube, and also, that corresponding rubber sheets, or linings can be placed over and upon each layer of the braided, or woven strands, in the same manner as that hereinabove described, thereby securing a strong hose, or tubing, and one of any desired thickness and weight. The hose, or tubing thus formed, then passes out of the machine, between the feed-rollers, when a strip of cloth, tin-foil, or other suitable flexible material, from a spool, h', is wound spirally around the same.

This spool h' travels around the mandrel in a vertical plane, being attached to the arm k' of the gear-wheel l', turning in bearings of the cross-bar m', which gear receives motion, through intermediate gears, from the gear-wheel n', on the driving-shaft. The tubing is then ready for vulcanization by any of the well-known processes.

In order to regulate the degree of tension of the strands wound upon the bobbins, while being braided, and to adjust the delivery of the same to the mandrel at pleasure, and as desired, I place each bobbin t between the two end-pieces of a spring-frame, o'.

These pieces are connected, at one end, by a cross-piece, p', and at the other by means of a screw-rod, q', which, being turned in the proper direction, will cause the said end-pieces to more or less bind upon the ends of the bobbins, and, consequently, produce more or less friction upon the same, and regulating the revolution of the spool, or bobbin t upon its spindle r', thereby allow more or less of the strand, or wire, &c., to be delivered to the mandrel, as may be deemed desirable, the many advantages of which are evident.

For the maintenance, at all times and at all positions, of the bobbins with regard to the mandrel as they move about upon their guiding-plate, of a uniform degree of tension upon the strands, the spring b'', hereinbefore referred to, it is evident will so adjust itself by its retraction or elasticity, as to yield to the strands, or "take up" the slack in the same, in direct proportion thereto.

It may be here remarked, that the strands used, both as longitudinal and transverse binders, may be coated or saturated with rubber; also, that the rubber sheet may be passed through in a sticky, or tacky condition, in order that it may be more firmly united when closed around the mandrel, &c.; also, that the edges of the rubber sheet, after it is lapped around the mandrel, &c., may be cemented by the use of any of the ordinary rubber cement.

Having thus described my new improvements, I will state my claim as follows:

What I claim as my invention, and desire to have secured to me by Letters Patent, is—

1. Forming a hose, or tube by the combination of such devices as will first cause a sheet or sheets of rubber, gutta-percha, &c., or of cloth coated with either or both, to be fed to and lapped, or partially lapped, around a mandrel, and one or more sets of braiding, or weaving-devices, so operating as to braid, or weave cords, threads, wire, &c., around said sheet or sheets, as set forth.

2. In combination with the above arrangement of devices for feeding to and placing upon the different plies of the hose, or tube, a series of longitudinal-binding threads, wires, &c., substantially as described.

3. The arrangement of devices for winding upon the hose, or tube, when finished, strips of cloth, tin-foil, or suitable flexible material, the same consisting of the spool h' and arm k', attached to gear-wheel m', receiving motion from the driving-shaft of the machine through intermediate gearings, substantially as hereinabove described.

THOS. J. MAYALL.

Witnesses:
ALBERT W. BROWN,
FREDERIC A. LAYER.